(12) United States Patent
Ziolkowski et al.

(10) Patent No.: US 7,957,904 B2
(45) Date of Patent: Jun. 7, 2011

(54) TRUE AMPLITUDE TRANSIENT ELECTROMAGNETIC SYSTEM RESPONSE MEASUREMENT

(75) Inventors: Anton Ziolkowski, Edinburgh (GB); Bruce Hobbs, Penicuilk (GB); Graham Dawes, Edinburgh (GB); David Wright, North Berwick (GB)

(73) Assignee: MTEM Ltd., Edinburgh (GB)

( * ) Notice: Subject to any disclaimer, the term of this patent is extended or adjusted under 35 U.S.C. 154(b) by 326 days.

(21) Appl. No.: 11/886,378

(22) PCT Filed: Dec. 13, 2005

(86) PCT No.: PCT/GB2005/004773
§ 371 (c)(1),
(2), (4) Date: Feb. 6, 2009

(87) PCT Pub. No.: WO2006/114561
PCT Pub. Date: Nov. 2, 2006

(65) Prior Publication Data
US 2009/0216454 A1  Aug. 27, 2009

(30) Foreign Application Priority Data
Mar. 14, 2005 (GB) .................................. 0505160.2

(51) Int. Cl.
*G01V 1/40* (2006.01)
*H04B 15/00* (2006.01)
(52) U.S. Cl. ............... 702/7; 702/17; 702/104; 702/189
(58) Field of Classification Search ............... 702/7–17, 702/103–107, 182–189
See application file for complete search history.

(56) References Cited

U.S. PATENT DOCUMENTS

| | | | |
|---|---|---|---|
| 4,417,210 A * | 11/1983 | Rocroi et al. | ............... 324/336 |
| 4,710,708 A | 12/1987 | Rorden et al. | |
| 5,467,018 A | 11/1995 | Ruter et al. | |
| 6,914,433 B2 | 7/2005 | Wright et al. | |

(Continued)

FOREIGN PATENT DOCUMENTS

WO    WO 03/023452    *    3/2003

(Continued)

OTHER PUBLICATIONS

K.-M. Strack, "Exploration with Deep Transient Electromagnetics"; 1992; pp. 154-156.

(Continued)

*Primary Examiner* — Andrew Schechter
*Assistant Examiner* — Phuong Huynh
(74) *Attorney, Agent, or Firm* — E. Eugene Thigpen; Shannon Powers

(57) ABSTRACT

A method for mapping sub-surface resistivity contrasts comprising making multi-channel transient electromagnetic (MTEM) measurements using at least one electric source with grounded input current electrodes or one magnetic source with current in a wire loop or multi loop and at least one electric field or magnetic field receiver, measuring the resultant earth response simultaneously at each receiver using a known recording system, measuring the system response by measuring directly the current in the wire at the source using effectively the same recording system, using the measured system response to recover the impulse response of the earth from each measured earth response, and creating from such impulse responses a sub-surface representation of resistivity contrasts.

15 Claims, 3 Drawing Sheets

U.S. PATENT DOCUMENTS

| | | |
|---|---|---|
| 7,771,938 B2 | 8/2010 | Zanni et al. |
| 2005/0237063 A1 | 10/2005 | Wright et al. |
| 2009/0230970 A1 | 9/2009 | Ziolkowski |
| 2010/0017156 A1 | 1/2010 | Ziolkowski et al. |
| 2010/0090701 A1 | 4/2010 | Ziolkowski |
| 2010/0134110 A1 | 6/2010 | Ziolkowski |

FOREIGN PATENT DOCUMENTS

| | | |
|---|---|---|
| WO | 2006114561 A3 | 8/2004 |
| WO | 2004072684 A1 | 11/2006 |

OTHER PUBLICATIONS

A. Hoheisel, A. Hordt, T. Hanstein; "The influence of induced polarization on long-offset transient electromagnetic data"; 2004; Geophysical Prospecting, vol. 52, pp. 417-426.

D. Wright, A. Ziolkowski, B. Hobbs, Hydrocarbon detection and monitoring with a multichannel transient electromagnetic (MTEM) survey; 2002; The Leading Edge, vol. 21, pp. 851-864.

International Preliminary Report on Patentability, Nora Lindner, Sep. 18, 2007.

* cited by examiner

TRUE AMPLITUDE TRANSIENT ELECTROMAGNETIC SYSTEM RESPONSE MEASUREMENT

CROSS REFERENCE TO RELATED APPLICATION

The present application is the U.S. national stage application of International Application PCT/GB2005/004773, filed on Dec. 13, 2005, which international application was published on Nov. 2, 2006 as International Publication WO 2006/114561. The International Application claims priority of United Kingdom Patent Application 0505160.2, filed on Mar. 14, 2005.

The present invention relates to a multi-channel transient electromagnetic (MTEM) system and method for estimating the response of the earth to electromagnetic pulses, thereby to detect hydrocarbon-bearing or water-bearing formations. The present invention also relates to a method for verifying the effectiveness of the methodology.

Porous rocks are saturated with fluids. The fluids may be water, gas, or oil, or a mixture of all three. The flow of current in the earth is determined by the resistivities of such rocks, which are affected by the saturating fluids. For instance, brine-saturated porous rocks are much less resistive than the same rocks filled with hydrocarbons. Hence the geophysical objective is to determine whether hydrocarbons are present by measuring the resistivity of geological formations. If tests using other methods, for instance seismic exploration, suggest that a geological formation has the potential to bear hydrocarbons, then before drilling it is important to have some indication as to whether the formation does in fact contain hydrocarbons or whether it is primarily water bearing. This can be done using electromagnetic techniques, and more specifically time domain electromagnetic techniques.

Conventionally, time domain electromagnetic investigations use a transmitter and one or more receivers. The transmitter may be an electric source, that is, a grounded bipole, or a magnetic source, that is, a current in a wire loop or multi-loop. The receivers may be grounded bipoles for measuring potential differences, or wire loops or multi-loops or magnetometers for measuring magnetic fields and/or the time derivatives of magnetic fields. The transmitted signal is often formed by a step change in current in either an electric or magnetic source, but any transient signal may be used, including, for example, a pseudo-random binary sequence.

Because of the enormous potential for time and cost savings that could be provided by the correct identification of hydrocarbon bearing structures, significant research resources have been invested in time domain electromagnetic techniques, and there is a large amount of published literature in this area. One textbook on the subject, "Exploration with deep transient electromagnetics" by K.-M. Strack, (1992), Elsevier, describes the Long-Offset Transient ElectroMagnetic (LOTEM) method. This uses a large electric source—typically a cable about 1-2 km long, carrying a current and grounded at each end—with a series of receivers placed several kilometers from the source. The data interpretation assumes that the response at each receiver depends only on the resistivity profile directly below it. The decay curve measured by each receiver may be converted to an apparent resistivity profile and the apparent resistivity profiles for the different receivers may be combined to assess the likelihood of the structure containing hydrocarbons To correct for the effect that is introduced into the signal response by the source signal and the measurement system itself, on pages 154-156 of his textbook, Strack presents two alternative methods to measure the system response. These are shown schematically in Figure 5.32 on page 155. The first method is to measure the output of the switchbox in the laboratory, without a load, through the recording system. Strack recognises that different filter settings can be used in the recording system and the response should be measured for each setting. The second method requires a measurement in the field using a coil 40 m by 40 m near the cable carry the current at the source, with the system under load, and applying a current to the ground. Strack says the first method is adequate for responses longer than one second, and the second method is to be preferred for shorter responses. He talks about the stability of the system response, with the implication that variations in the measurement of the system response must be caused by instabilities in the method of measuring it, rather than because the system response itself may be varying. However, as will be described in more detail later, this is a fundamental misconception, and in practice, the system response may vary as a function of time.

More recently, Hoheisel, A., Hördt, A., and Hanstein, T., in a paper entitled 'The influence of induced polarization on long-offset transient electromagnetic data', published in Geophysical Prospecting, 2004, Vol 52, pages 417-426, proposed that the system response be measured as the electric field potential between two electrodes spaced 1 m apart parallel to the transmitter cable and "at an offset of 3 m in the equatorial configuration".

The article "Hydrocarbon detection and monitoring with a multichannel transient electromagnetic (MTEM) survey" by Wright, D., Ziolkowski, A., and Hobbs, B., (2002), The Leading Edge, 21, 852-864, describes the multichannel transient electromagnetic method, which is a significant improvement over LOTEM for exploring below the earth's surface. In some respects it is similar to LOTEM: there is a source, usually a current applied between a pair of grounded electrodes, and receivers, usually measuring the potential difference between electrodes along a line. However, the multichannel transient electromagnetic method acknowledges that the response at each receiver depends on the whole earth between the source and receiver and not simply on the earth directly below the receiver.

WO 03/023452 A1 describes in more detail a hydrocarbon detection and monitoring technique that uses the multichannel transient electromagnetic method. In WO 03/023452 A1, it is proposed that the system response be measured at every source position and for every transient. This is done because it was appreciated by the inventors of WO 03/023452 A1 that contrary to accepted teachings, as exemplified for example by Strack, the system response itself may vary as a function of time and place and so the only way to know the system response at a given time and place is to measure it.

WO 03/023452 A1 describes various methods for measuring the system response. In the case of a current dipole source, it is suggested that the measurement of the electric field system response could be measured with two electrodes placed very close to the source (similar to Hoheisel et al., 2004). For a magnetic field system response, it is suggested that a small horizontal loop could be placed close to the source or the input current could be measured directly. However, no specific technique for doing this is described. The present invention is directed to an improved technique for determining the system response, and so an improved technique for identifying resistivity contrasts.

According to one aspect of the present invention, there is provided a method for mapping sub-surface resistivity contrasts comprising making multi-channel transient electromagnetic measurements using at least one electric source with grounded input current electrodes or one magnetic source with current in a wire loop or multi loop and at least one electric field or magnetic field receiver, measuring the resultant earth response simultaneously at each receiver using a known recording system, measuring the input current system response by measuring directly the current at the source using effectively the same recording system, using the measured system response to recover the impulse response of the earth from each measured earth response, and creating from such impulse responses a sub-surface representation of resistivity contrasts.

By measuring the input current directly and defining the system response in terms of the input current, it has been found a true amplitude determination of the system response can be achieved. In practice, this means that recovery of the true amplitude of the earth impulse response can also be achieved. This has led to a significant improvement in the identification of resistivity contrasts.

According to another aspect of the present invention, there is provided a system for mapping sub-surface resistivity contrasts comprising a multi-channel transient electromagnetic measurement (MTEM) system having at least one electric source having input current electrodes, or magnetic source with current in a wire loop or multi loop, means for measuring the resultant earth response simultaneously at each receiver using a known recording system, means for measuring the system response by measuring directly the current to the input current electrodes or in the wire loop or multi loop using effectively the same recording system, processing means for deconvolution of the measured earth response for the measured system response to recover the corresponding electromagnetic impulse response of the earth, and display means for displaying such impulse responses, or any transformation of such impulses, to create a sub-surface representation of resistivity contrasts.

The system response is the measurement of the current input to the source and recorded with essentially the same means as are used to record the earth response at the receivers. The input current at the source electrodes may be measured using a magnetometer, for example using Hall Effect technology (http://hyperphysics.phy-astr.gsu.edu/hbase/magnetic/hall.html#c3), which has a high frequency response (DC-100 kHz), a fast response time (less than a microsecond), large dynamic range (5 mA-30 A, with 1 mA resolution), and is non-intrusive and safe.

According to yet another aspect of the invention, there is provided a method for checking that an earth impulse response estimated using a time domain electromagnetic technique is correct comprising measuring the earth response and the system response using a first source/receiver configuration; estimating the earth impulse response using the measured data; interchanging the source and receiver; measuring the earth response and the system response in the interchanged configuration; estimating the earth impulse response using the interchanged configuration data and comparing the estimates of the earth impulse response.

Various aspects of the invention will now be described by way of example only and with reference to the accompanying drawings, of which:

Figure 3:
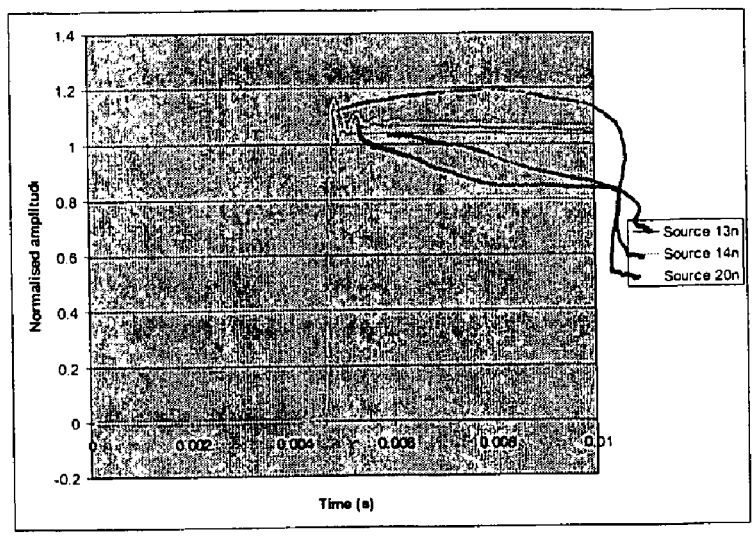
Figure 4:
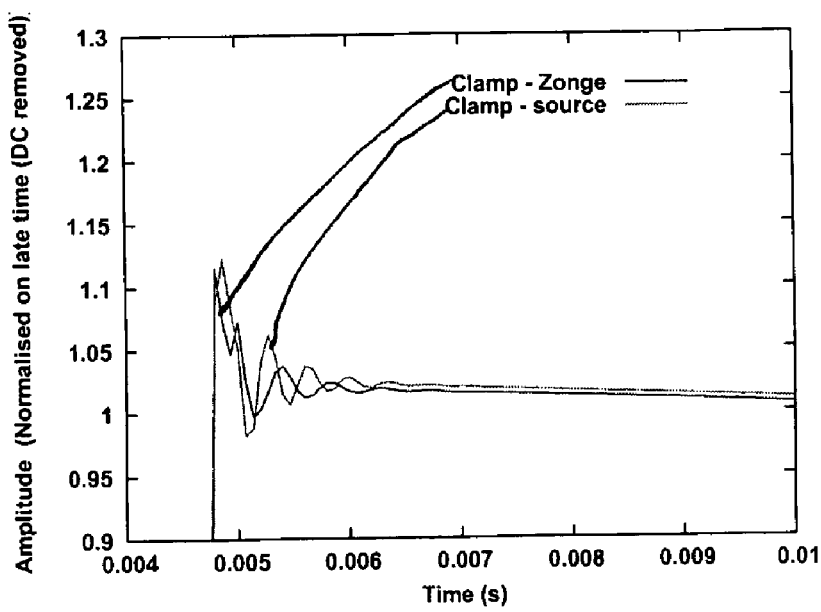

FIG. 3 shows plots of system response measurements at different source positions and for different values of current. The plots have been normalised to show the variations. The current switches at approximately 5 ms after start of data;

FIG. 4 shows plots of two system response measurements: the output from the transmitter and the input to the source electrodes. The plots have been normalised to show the variations.

Figure 5:
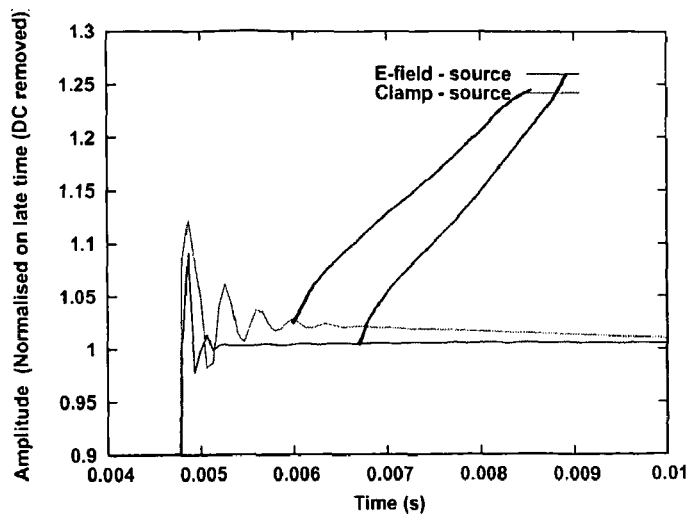

FIG. 5 shows plots of two different ways to measure the system response, and

Figure 6:
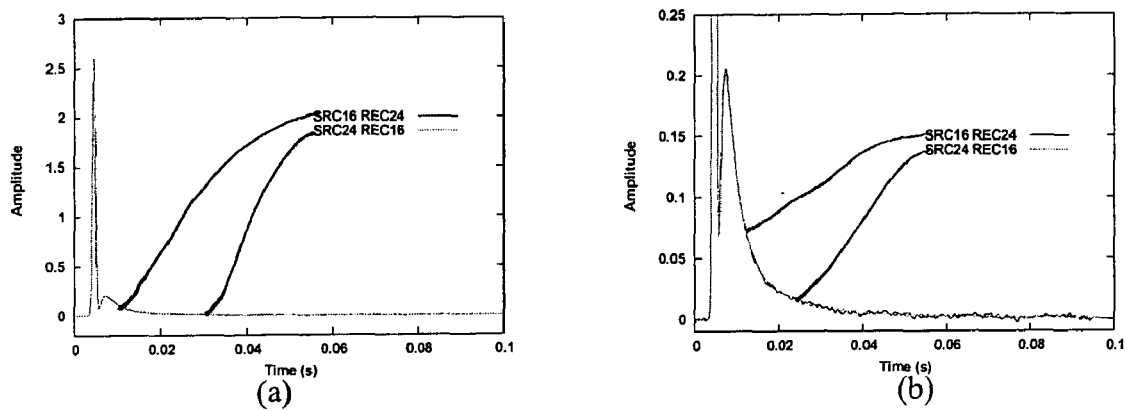

FIG. 6 shows estimated impulse responses for reciprocal source/receiver pairs.

Figure 1:
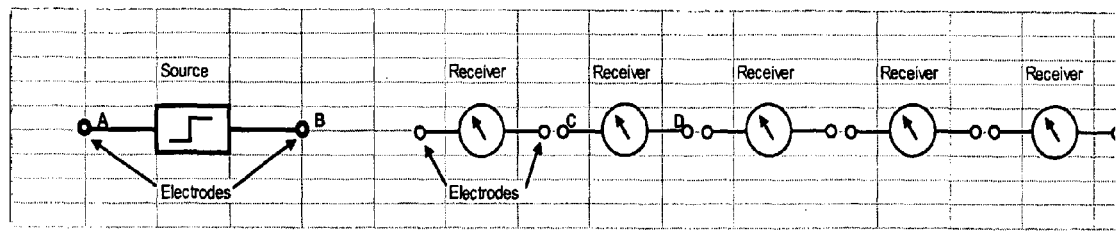
FIG. 1 shows a typical source-receiver configuration, with a current bipole source and its two electrodes and receivers, in this case in line with the source, measuring the potential between receiver electrodes for performing a method according to the invention.

FIG. 1 shows a typical source-receiver configuration. This has a current bipole source with two electrodes, and a line of receivers, in this case in line with the source, measuring the potential between receiver electrodes for performing a method according to the invention. In FIG. 1 the source is a current in a cable with an electrode at each end, each electrode being grounded. The two source electrodes are typically 100 m apart. The current is measured in the wire between the two electrodes. The receivers may measure two kinds of electromagnetic response: potential differences, or the rate of change of the magnetic field. In FIG. 1, potential differences measured between two grounded electrodes, typically 100 m apart, are shown while the rate of change of the magnetic field is measured with loops of wire, typically 50 m by 50 m square loops with many turns. The receiver spread is typically several kilometers long; that is, there are typically tens of receivers rather than the five shown in FIG. 1.

The source can be positioned outside the receiver spread, as shown in FIG. 1, or within the receiver spread and, in practice, the source or the receiver spread, or both, are moved, depending on the application. The recorded transient responses from the receivers are suitably downloaded to the hard disk, or other storage medium, of a computer.

Figure 2:
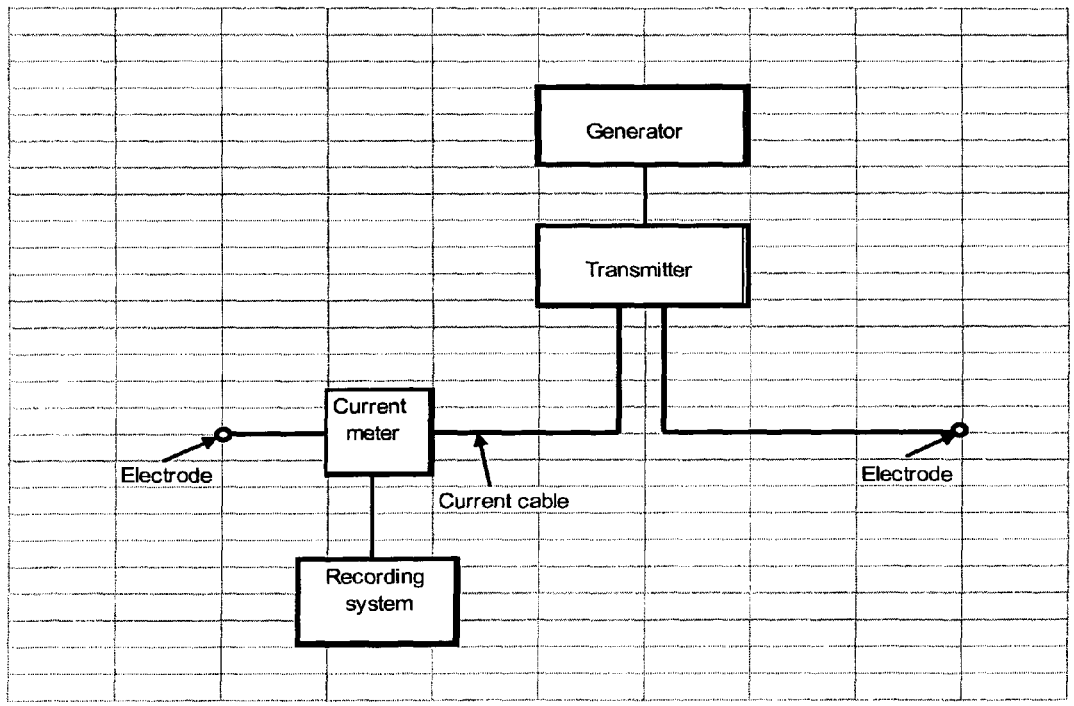
FIG. 2 shows a schematic diagram of the cable between the source electrodes, the current source, or transmitter, and the current meter and recording system to measure the system response.

FIG. 2 is a more detailed diagram of the source of FIG. 1. This shows the cable between the source electrodes, the current source, or transmitter, a current meter for measuring the input current directly and a recording system to measure the system response. In this case, the current meter is positioned at or as close as possible to one of the source electrodes, so that a direct measure of the input current can be made. The current meter may be of any suitable form, for example a magnetometer.

At a receiver the measured response is the convolution $$E(k,x_s,x_r,t)=s(k,x_s,x_r,t)*g(x_s,x_r,t)+n(k,x_r,t), k=1, 2,\ldots,N \quad (1)$$

in which the asterisk * denotes convolution, $s(k,x_s,x_r,t)$ is the measured system response, $g(x_s,x_r,t)$ is the unknown impulse response of the earth, and $n(k,x_r,t)$ is uncorrelated noise; k is the record number in the sequence of N records recorded; $x_s$ is the source position, $x_r$ is the receiver position, and t is time.

To find the unknown earth response $g(x_s,x_r,t)$ it is essential to know the system response $s(k,x_s,x_r,t)$. For the purposes of the present invention, this is defined as the current $i(k,x_s,t)$ input to the source electrodes (for a current bipole source) or to the loop or multiloop (for a magnetic source) convolved with the impulse response of the recording system at the receiver $r(x_r,t)$:

$$s(k,x_s,x_r,t)=i(k,x_s,t)*r(x_r,t). \quad (2)$$

In practice, it is normally not possible to measure the current at the source with the same instrument that is simultaneously measuring the voltage or magnetic field at the receiver. Normally an identical instrument is used at the source to give measurements of the system response $$s(k,x_s,x_r,t)=i(k,x_s,t)*r(x_s,t), k=1, 2, \ldots, N, \qquad (3)$$

in which $$r(x_r,t)=r(x_s,t). \qquad (4)$$

In FIG. 2, the current meter measures the current $i(k,x_s,t)$ in the cable and is connected to the recording system box, which has the impulse response $r(x_s,t)$. If equation (4) does not hold, it is necessary to know the relationship between the impulse response of the source instrument $r(x_s,t)$ and the impulse response of the receiver instrument $r(x_r,t)$. That is, the two impulse responses are related by the equation $$r(x_r,t)=r(x_s,t)*f(x_s,x_r,t), \qquad (5)$$

The input current function $i(k,x_s,t)$ is a time-varying function that may be different each time k it is injected and it depends on the conditions at the source position $x_s$, as shown in FIG. 3. It may also vary with the length of cable between the transmitter and the source electrodes; that is, the output of the transmitter is not necessarily the input to the earth, as shown in FIG. 4, which shows plots of system response measurements; the red curve is the output from the transmitter; the green curve is the input to the source electrodes. The plots have been normalised to show the variations. In practice, it has been found that variations between the current measured at the transmitter and the actual current input at the source are not exactly equal, because the effect of the capacitance between the two output wires from the transmitter. Ideally the input current at the source should be measured.

FIG. 3 shows three different measurements of the system response $s(k,x_s,x_r,t)$ for different source positions, and for different values of current. The plots have been normalised to show the variations. The current switches at approximately 5 ms after start of data. This shows that the switch is not perfectly clean: the transmitter behaviour is dependent on the load at the source.

To recover the impulse response $g(x_s,x_r,t)$ from the measured data, the following steps are taken: removal of cultural noise (e.g. 50 Hz or 60 Hz); deconvolution of $s(k,x_s,x_r,t)$ to recover an estimate of $g(x_s,x_r,t)$, and stacking up to N such estimates to improve the signal-to-noise ratio, in which N is typically about 2000.

Many techniques for the removal of cultural noise are known and so will not be described here in detail. However, it is important that some steps are taken to address this. Cultural noise is the background noise generated by electricity generation, typically 50 Hz in Europe and 60 Hz in the United States and Canada. In the vicinity of electric railways there are often other frequencies, for instance 16⅔ Hz. Removal of cultural noise usually means removing the component of the data at the known frequency that does not belong to the signal: it normally has a much larger amplitude and a different phase.

As far as the deconvolution step is concerned, any suitable technique can be used, such as described, for example, by Ziolkowski, A., 1984, Deconvolution, International Human Resources Development Corporation, Boston, Mass. For the ideal, noise-free case, it is theoretically possible to design an inverse system response filter $fs^{IDEAL}(k,x_s,x_r,t)$, such that convolution of the filter with the system response would yield a perfect impulse $\delta(t)$:

$$s(k,x_s,x_r,t)*fs^{IDEAL}(k,x_s,x_r,t)=\delta(t). \qquad (6)$$

Convolution of this filter with the measurement of equation (1) would yield the impulse response of the earth $g(x_s,x_r,t)$ plus noise. It is well known that the convolution of the inverse filter with the noise magnifies the noise so much that it swamps the signal, especially at high frequencies where the signal amplitude is small. In practice, therefore, it is necessary to replace the perfect impulse $\delta(t)$ with a band-limited impulse $d(t)$.

The choice of a function for $d(t)$ is open. In tests, the Gaussian function $\exp(-\alpha t^2)$ has been used, in which $\alpha$ is a free parameter and can be adjusted to suit the situation. The deconvolution filter becomes $fs(k,x_s,x_r,t)$, where $$s(k,x_s,x_r,t)*fs(k,x_s,x_r,t)=d(t). \qquad (7)$$

In practice it is not always possible to satisfy equation (7) exactly and some approximation to $fs(k,x_s,x_r,t)$ has to be found. As will be appreciated by a skilled person, there are several ways to do this, one of which is to use the well-known least-squares approach described by Levinson N., 1947, The Wiener RMS (Root Mean Square) Error Criterion in Filter Design and Prediction, Appendix B in Wiener, N., 1947, Extrapolation, Interpolation and Smoothing of Stationary Time Series, Technology Press of the Massachusetts Institute of Technology, Cambridge, Mass.

The filter may then be applied to the measurement in (1) to yield:

$$\begin{aligned} fs(k, x_s, x_r, t)*E(k, x_s, x_r, t) &= fs(k, x_s, x_r, t)*s(k, x_s, x_r, t)* \\ &\quad g(x_s, x_r, t) + \\ &\quad fs(k, x_s, x_r, t)*n(k, x_r, t) \\ &= d(t)*g(x_s, x_r, t) + \\ &\quad fs(k, x_s, x_r, t)*n(k, x_r, t). \end{aligned} \qquad (8)$$

The first term on the right-hand side of equation (8), $d(t)*g(x_s,x_r,t)$, is the convolution of the impulse $d(t)$ with the impulse response $g(x_s,x_r,t)$ and is the best estimate of the impulse response for this measurement. The second term $fs(k,x_s,x_r,t)*n(k,x_r,t)$ is the convolution of the filter with the noise and it contaminates the estimate of the impulse response.

In practice, the measurement in (1) is repeated many times. For each of these measurements a separate filter $fs(k,x_s,x_r,t)$ may be calculated and applied, as in equation (8). The impulse response term, or signal, is the same every time if $d(t)$ is fixed, but the noise term is different because it is independent of the earth response. Summing up the results of all these filtered measurements, or stacking, adds the signal coherently, but not the noise, and therefore it increases the signal-to-noise ratio.

Sometimes, there are enormous bursts of noise that occur on some measurements, but not on all. It is sensible not to include these very noisy measurements in the summation and in general a subset, say n, of the complete set of N measurements is used in the stacking process Thus, the estimate of the earth impulse response is:

$$\bar{g}(x_s, x_r, t) = \frac{1}{2}\sum_{k=1}^{n}[d(t)*g(x_s, x_r, t) + fs(k, x_s, x_r, t)*n(k, x_r, t)], \qquad (9)$$

$$n \leq N,$$

in which the records have been renumbered and only those in which there is not excessive noise are included. In tests we have found a signal-to-noise ratio of 60 dB to be desirable. It is often difficult to get detailed information from data in which the signal-to-noise ratio is less than about 40 dB.

In principle the filter fs(k,$x_s$,$x_r$,t) is different for every measurement in the suite. However, the measurements of the system response s(k,$x_s$,$x_r$,t) may be essentially identical within a suite; that is, they may be independent of k:

$$s(k,x_s,x_r,t)=s(x_s,x_r,t), \text{ for all } k. \quad (10)$$

If this is the case—and this can be determined only by making the system response measurements (3)—the deconvolution can be applied after the summation. That is, $$\bar{g}(x_s, x_r, t) = \quad (11)$$

$$fs(x_s, x_r, t) * \left( \frac{1}{n} \sum_{k=1}^{n} [s(k, x_s, x_r, t) * g(x_s, x_r, t) + *n(k, x_r, t)] \right),$$

in which the filter fs($x_s$,$x_r$,t) is obtained from $$s(x_s,x_r,t)*fs(x_s,x_r,t)=d(t). \quad (12)$$

This should give the same result as the deconvolution the process leading to (9), but the computational effort required is much less.

As mentioned previously, the technique in which the invention is embodied allows a true amplitude determination of the system response to be achieved. FIG. 5 shows plots of two different ways to measure the system response. The red curve shows the potential difference, or voltage, between two electrodes placed close together and between the current source electrodes. The green curve shows the current input to the source electrodes as measured directly using a current meter in line with the current supply. The plots have been normalised to allow the shapes to be compared. The shapes are fairly similar, but the scales are different, because one plot is volts, while the other is amps. Using the measurement of the current leads to a correct deconvolution of the measured data and a significant improvement in the identification of subsurface resistivity contrasts.

To check that the deconvolution has been performed correctly, the reciprocity theorem can be used. With a source current applied between electrodes at A and B and the received voltage measured between electrodes C and D, for example, as illustrated in FIG. 1, the earth impulse response is the same as that for the source and receiver interchanged; that is, for the current applied between C and D and the voltage measured between A and B. Mathematically, this can be written as follows $$g(x_s,x_r,t)=g(x_r,x_s,t). \quad (13)$$

In practice, the impulse response cannot be recovered perfectly, because of the noise, but it can be estimated. In practice, what is required is:

$$\bar{g}(x_s,x_r,t)=\bar{g}(x_r,x_s,t). \quad (14)$$

FIG. 6(a) shows two recovered impulse responses for reciprocal source-receiver pairs. In this case, the source electrodes are 100 m apart and the receiver electrodes are 100 m apart in the same line. The mid-point of the source electrodes is 800 m from the midpoint of the receiver electrodes. The graph shows two curves, obtained by interchanging the source and receiver but keeping the electrode positions the same. FIG. 6(b) shows the same as (a), but on a magnified scale allowing the difference between the two responses to be seen. No differential scaling has been applied to the two responses.

The impulse responses shown in FIG. 6(a) and FIG. 6(b) are almost perfectly identical. The difference between the two estimates of what should be the same impulse response is very small compared with the signal—about −60 dB—which is the same as the noise level. This test has been done in many locations and the results shown in FIG. 6 are typical. Each time the source and receiver are interchanged, this changes both the source and receiver conditions and therefore the system response. Hence, this test shows that the same earth impulse response is recovered, regardless of local conditions and therefore both the measurement of the system response and its deconvolution are handled correctly.

A skilled person will appreciate that variations of the disclosed arrangements are possible without departing from the invention. Accordingly, the above description of a specific embodiment is made by way of example only and not for the purposes of limitations. It will be clear to the skilled person that minor modifications may be made without significant changes to the operation described.

What is claimed is:

1. A method for mapping sub-surface resistivity contrasts and checking the correctness of an intermediate step comprising:

making one or more transient electromagnetic measurements in a first configuration using at least one electric source with grounded input current electrodes or at least one magnetic source with current in a wire loop or multi loop and at least one electric field or magnetic field receiver, concurrently measuring:

a resultant first earth response at the at least one receiver using a known recording system, and a first true amplitude system response by measuring directly a first current in a wire at the at least one source using effectively the same recording system, using the measured first true amplitude system response to recover a first estimated earth impulse response from each measured first earth response, interchanging the at least one source and the at least one receiver to create a second configuration, making one or more transient electromagnetic measurements in the second configuration, concurrently measuring:

a resultant second earth response at the at least one receiver using the known recording system, and a second true amplitude system response by measuring directly a second current in the wire at the at least one source using effectively the same recording system, using the measured second true amplitude system response to recover a second estimated earth impulse response from each measured second earth response, comparing the first and the second estimated earth impulse responses to confirm that they are identical apart from uncorrelated noise, and creating from the first and second estimated earth impulse responses a representation of sub-surface resistivity contrasts.

2. A method as claimed in claim 1 wherein the system response is defined as the convolution of the input current with the impulse response of the recording system at the receiver, i.e. s(k, $x_s$, $x_r$, t)=i(k, $x_s$, t)*r($x_r$, t), or a function of the impulse response at the receiver, i.e. s(k, $x_s$, $x_r$, t)=i(k, $x_s$, t)*r($x_r$, t)*f($x_s$, $x_r$, t).

3. A method as claimed in claim 1 or claim 2 wherein measuring the input current directly involves using a magnetometer.

4. A method according to claim 1 or claim 2, wherein said source comprises at least one current loop and measuring the system response involves measuring current in the at least one current loop.

5. A method as claimed in claim 1 or claim 2 wherein the measured earth response is expressed as: $E(k, x_s, x_r, t) = s(k, x_s, x_r, t) * g(x_s, x_r, t) + n(k, x_r, t)$, $k = 1, 2, \ldots, N$, where the asterisk * denotes convolution, $s(k, x_s, x_r, t)$ is the measured system response, $g(x_s, x_r, t)$ is the unknown impulse response of the earth, and $n(k, x_r, t)$ is uncorrelated noise; k is the record number in the sequence of N records recorded; $x_s$ is the source position, $x_r$ is the receiver position, and t is time.

6. A method according to claim 5, wherein an estimate of the earth impulse response with noise is obtained by deconvolution of the equation for the measured system response.

7. A method as claimed in claim 6 wherein deconvolution of the equation is done using a filter $fs(k, x_s, x_r, t)$, where $s(k, x_s, x_r, t) * fs(k, x_s, x_r, t) = d(t)$, the asterisk * denotes convolution and $d(t)$ is a band limited impulse.

8. A method as claimed in claim 7 wherein approximation techniques are employed to estimate $fs(k, x_s, x_r, t)$.

9. A method as claimed in claim 7 wherein a filter $fs(k, x_s, x_r, t)$ is calculated for every measurement.

10. A method according to claim 6 comprising summing the estimated earth impulse responses and determining an average.

11. A method as claimed in claim 10 wherein the steps of summing and averaging are done before the step of deconvolution.

12. A method as claimed in claim 1 or claim 2 wherein the measured response is processed to remove cultural noise prior to further processing of that response.

13. A method as claimed in claim 1 or claim 2 comprising identifying and removing from a measurement set any responses that are significantly noisier than other responses.

14. A method according to claim 1 or claim 2, wherein the MTEM measurements are made on the earth's surface.

15. A method according to claim 1 or claim 2, wherein the MTEM measurements are made at or near a sea floor of the earth's surface.

* * * * *